July 17, 1928. 1,677,418
E. H. VAN VALKENBERG
LANDING GEAR
Filed Oct. 23, 1926
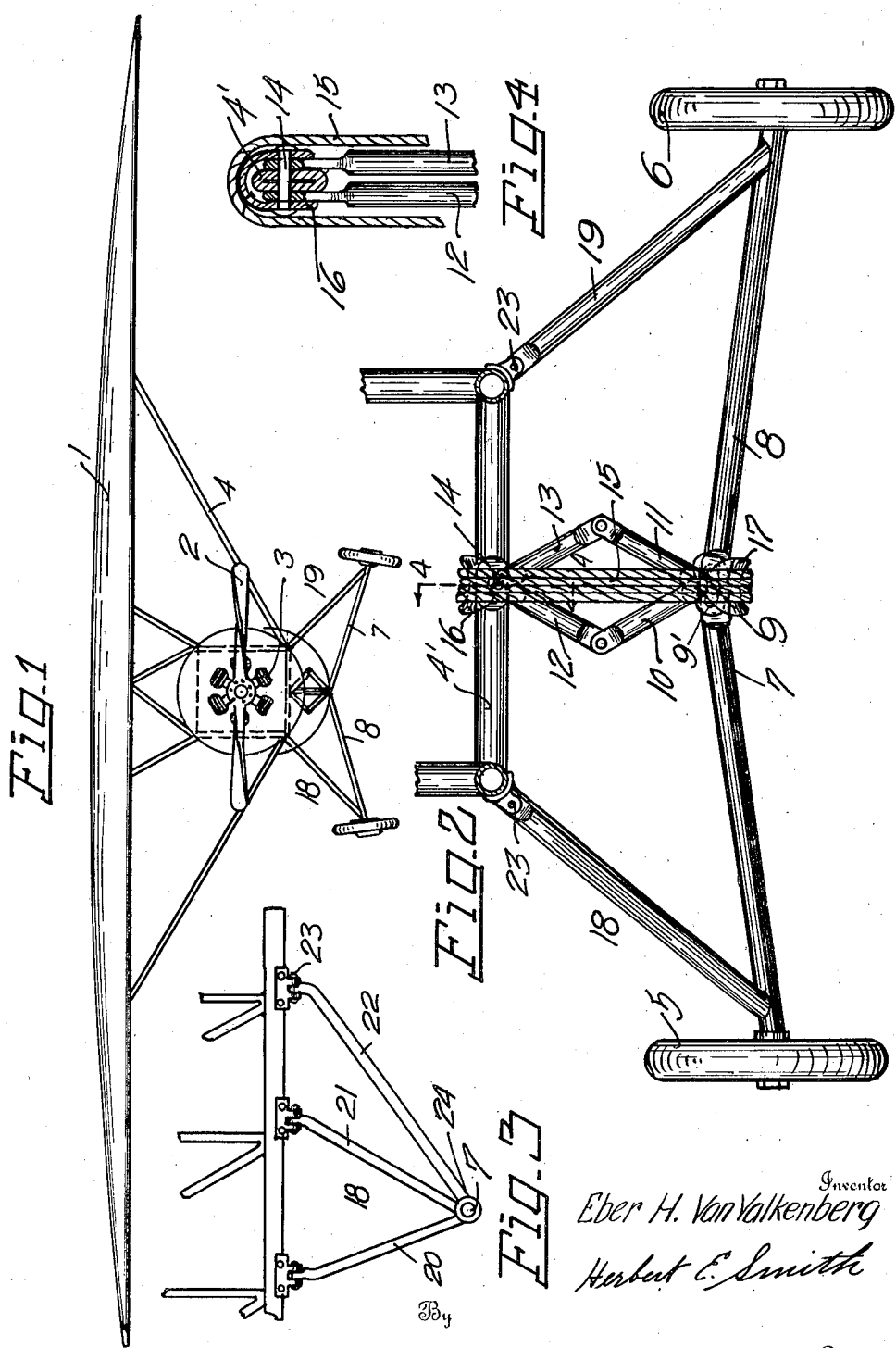
Inventor
Eber H. Van Valkenberg
Herbert E. Smith
By
Attorney Patented July 17, 1928.

1,677,418

UNITED STATES PATENT OFFICE.

EBER HARLEY VAN VALKENBERG, OF McKEESPORT, PENNSYLVANIA, ASSIGNOR OF ONE-HALF TO OSCAR SILVERSTEIN, OF SPOKANE, WASHINGTON.

LANDING GEAR.

Application filed October 23, 1926. Serial No. 143,622.

My present invention relates to improvements in landing gears or running gears for aeroplanes, which while herein shown in connection with a monoplane, are readily adapted for use in connection with various types of flying machines or air ships.

The primary object of the invention is the provision of a strong, durable and well braced shock absorbing appliance or accessory for aeroplanes by means of which a safe landing may be accomplished by the pilot without imparting excessive or undue vibrations to the aeroplane. To this end the landing gear, or running gear, here shown as of the two-wheel type is composed of pivoted frame members having hinged connection with the fuselage of the aeroplane and equipped with resilient cushioning means for absorbing the shocks incident to the contact of the wheels with the ground surface in landing. The carriage or frame for the wheels, as a whole, is capable of assuming one form during flight, and another form when landing and receiving the shock from contact with ground surfaces under weight of the load of the aeroplane. In the latter position the weight of the load spreads the wheels apart from their normal, flying, position, in order that they may run or travel correctly during the landing operation. When the aeroplane is in the air and the load removed from the wheels, the carriage automatically returns to normal flying position and draws the wheels to a cambered position.

The invention consists in certain novel combinations and arrangements of parts involving the carriage and its pivotal suspension from the fuselage, together with the shock absorbing means for the carriage, as will hereinafter be more fully pointed out and claimed.

In the accompanying drawings I have illustrated my invention physically embodied in a two-wheel landing gear for a monoplane, in which the parts are combined and arranged according to one mode I have devised for the practical application of the principles of my invention.

Figure 1 is a front elevation of a monoplane, equipped with the landing gear of my invention and shown in flying position.

Figure 2 is an enlarged detail view showing in section a part of the fuselage from which the landing gear is suspended and shown in ground position.

Figure 3 is a detail side view of one of the struts or side frame-sections suspended from the fuselage.

Figure 4 is an enlarged detail view partly in section showing the pivot of a portion of the toggle connection on the fuselage, this being the fixed point of the toggle connection, together with a strand of the shock-absorbing cord or cable.

In order that the general arrangement and assembly of parts may readily be understood I have illustrated in Figure 1 a flying machine of the monoplane type having a supporting plane 1, tractor screw or propeller 2 and power plant 3 of any approved structures. The landing gear here shown of the two-wheel type is suspended from the fuselage indicated as a whole by the numeral 4, and one of its cross or transverse bars 4'.

As seen best in Figure 2 the landing gear, in the form of a carriage for the two wheels 5 and 6, comprises a pair of opposed V-shaped struts or angular frame-sections with the wheels at the apices of the angles, and these struts are hinged to the fuselage, as well as pivoted thereto, at an intermediate point, by means of a toggle connection between the struts and the fuselage or other rigid supporting member forming a fixed part of the aeroplane.

The carriage includes a divided axle as 7 and 8 at the respective ends of which the wheels 5 and 6 are journaled and the inner ends of these axle-sections are pivoted together at 9 on the longitudinal axis of the aeroplane. The axle sections are angularly disposed, the degree of angularity depending upon the formation of the carriage due to the presence or absence of a load imposed thereon. Thus, in flying position the angle of the two sections is greater than when in ground position, and in the latter position with the axle-sections more nearly straight the wheels 5 and 6 are in position to correctly travel or roll over the ground surface. In the flying position the wheels are cambered as indicated in Figure 1.

The pivot point 9 of the carriage is adapted to move in a vertical plane and it is connected with the rigid supporting structure or fuselage by means of a toggle connection including two pairs of pivoted links 10, 11 and 12, 13, of which the latter pair are pivoted at 14 to the cross bar 4' of the fuselage. About this toggle connection a shock-absorbing cable 15 is warped or wound in such manner as to afford adequate resiliency for the purpose of drawing the pivot point 9 toward the point 14 and for permitting the axle sections 7 and 8 to act as levers, when the weight of the aeroplane is imposed on the wheels as fulcrums, and the toggle connection is thus extended by action of the levers 7 and 8. The levers function when the aeroplane alights with the wheels contacting with the ground and receiving the load of the aeroplane. After the wheels are relieved of the load, as when taking off, the resiliency of the cable or cables 15 acts to spread the intermediate pivots of the toggle, draw upwardly the pivot point 9 and swing inwardly the two wheels 5 and 6 to the position of Figure 1.

The cable or cables pass around the two pivot points 9 and 14 and are supported by means of shield plates 16 and 17 through which the pivot bolts 14 and 9 are passed. These plates are U-shaped and straddle the pivot joints and are of sufficient size and area as to afford a friction or bearing surface for the cable or cables or other resilient means utilized in connection therewith for absorbing shocks.

The side-sections of the carriage include struts 18 and 19 (indicated as a whole) which are rigid with the respective axle sections 7 and 8 and pivotally suspended or hinged to the fuselage or other fixed support of the aeroplane. Each strut includes a plurality of bars as 20, 21, and 22 having alined hinges 23 on the fuselage and integral with the axle sections or rigidly fixed thereto as at 24. The pivot and hinge joints are of such nature and arrangement as to permit the required change of formation in the carriage due to the presence or absence of the load of the aeroplane. As for instance, the overlapping, inner ends of the sections 7 and 8 may be slotted as indicated at 9' to permit movement of the bolt and of the shaft sections.

Having thus fully described my invention what I claim as new and desire to secure by Letters Patent is—

1. In a landing gear for aeroplanes, the combination with a rigid structure, of a divided axle having a central pivot point, a toggle connection between said point and the rigid structure, a shock absorbing device in connection with said toggle connection, and lateral means for suspending the divided axles from the rigid structure.

2. The combination with an aeroplane fuselage, of a divided axle having landing wheels journaled thereon, a toggle connection pivotally joining the divided axle and fuselage, a pair of spaced struts rigid with the axle and hinged to the fuselage, and a shock-absorbing device co-acting with said toggle connection.

3. The combination with an aeroplane fuselage, of a divided axle, a toggle connection pivotally connecting the divided axle and fuselage, a shock absorbing cable warped about said toggle connection, and a pair of spaced struts rigid with the divided axle and hinged to the fuselage.

In testimony whereof I affix my signature.

EBER HARLEY VAN VALKENBERG.